US012681544B2

(12) United States Patent
Ding

(10) Patent No.: US 12,681,544 B2
(45) Date of Patent: Jul. 14, 2026

(54) FOLDING MECHANISM AND FOLDABLE ELECTRONIC EQUIPMENT

(71) Applicant: BEIJING XIAOMI MOBILE SOFTWARE CO., LTD., Beijing (CN)

(72) Inventor: Fei Ding, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 299 days.

(21) Appl. No.: 18/388,185

(22) Filed: Nov. 8, 2023

(65) Prior Publication Data

US 2025/0013269 A1     Jan. 9, 2025

(30) Foreign Application Priority Data

Jul. 4, 2023    (CN) .......................... 202310814441.4

(51) Int. Cl.
*G06F 1/16*          (2006.01)
*H04M 1/02*          (2006.01)

(52) U.S. Cl.
CPC ........ *G06F 1/1681* (2013.01); *H04M 1/0216* (2013.01); *H04M 1/0268* (2013.01)

(58) Field of Classification Search
CPC .. G06F 1/1681; H04M 1/0266; H04M 1/0268
See application file for complete search history.

(56) References Cited

U.S. PATENT DOCUMENTS

| | | | |
|---|---|---|---|
| 9,874,906 B1 * | 1/2018 | Hsu ........................ | G06F 1/1681 |
| 11,372,453 B2 * | 6/2022 | Yu ............................ | F16C 11/12 |
| 2018/0324964 A1 | 11/2018 | Yoo et al. | |
| 2022/0116489 A1 | 4/2022 | Nagai et al. | |
| 2025/0275073 A1 * | 8/2025 | Shen ..................... | G06F 1/1681 |

OTHER PUBLICATIONS

Extended European Search Report issued in Application No. 23212194.7 dated Apr. 30, 2024, (7p).

* cited by examiner

*Primary Examiner* — Anthony Q Edwards
(74) *Attorney, Agent, or Firm* — Arch & Lake LLP

(57) ABSTRACT

A folding mechanism, including: a base frame; a support, movably connected to the base frame; a rotor, including a sub-rotor that is rotatably connected to the base frame, where the sub-rotor includes a first connecting body that is slidingly connected to the support; and, a roller, rotatably provided on at least one of the first connecting body or the support, so that at least part of the first connecting body is in rolling friction fit with the support.

20 Claims, 11 Drawing Sheets

FOLDING MECHANISM AND FOLDABLE ELECTRONIC EQUIPMENT

CROSS REFERENCE

The present disclosure claims the benefit of priority to Chinese Patent Application No. 202310814441.4, filed on Jul. 4, 2023, and the entire contents of which are incorporated herein by reference for all purposes.

BACKGROUND

Electronic equipment such as mobile phones and tablet computers have become indispensable technological products in people's life, study and entertainment. Currently, the foldable electronic equipment using a flexible display screen require a mechanical folding mechanism to fold the flexible display screen, so as to ensure that no fault occurs during normal use of the flexible display screen and the normal bending of the flexible display screen is not affected. After the flexible display screen of the foldable electronic equipment is folded, the foldable electronic equipment can be easily carried; and after being unfolded, the flexible display screen has a larger display area, which is increasingly favored by consumers.

SUMMARY

The present disclosure relates to the field of electronic technology, and in particular, to a folding mechanism and a foldable electronic equipment.

According to a first aspect of embodiments of the present disclosure, there is provided a folding mechanism, including a base frame, a support, a rotor and a roller. The support is movably connected to the base frame. The rotor includes a sub-rotor that is rotatably connected to the base frame, and the sub-rotor includes a first connecting body that is slidingly connected to the support. The roller is rotatably provided on at least one of the first connecting body or the support, so that at least part of the first connecting body is in rolling friction fit with the support.

According to a second aspect of the embodiments of the present disclosure, there is further provided a foldable electronic equipment, including a flexible display screen and a folding mechanism according to any one of the above embodiments. The flexible display screen is folded or unfolded through the folding mechanism.

It should be understood that the foregoing general description and the following detailed description are exemplary and explanatory, and do not limit the present disclosure.

BRIEF DESCRIPTION OF THE DRAWINGS

The description of the accompanying drawings is used to help understand the accompanying drawings provided by the present disclosure. The schematic drawing embodiments of the present disclosure and their descriptions are used to explain the technical solutions of the present disclosure and do not constitute an improper limitation to the protection scope of the present disclosure.

In order to describe the technical solutions in the embodiments of the present disclosure more clearly, the drawings needed to be used in the description of the embodiments will be briefly introduced below. Obviously, the drawings in the following description are some embodiments of the present disclosure. For those of ordinary skill in the art, other drawings can be obtained based on these drawings without creative efforts.

EXPLANATION OF REFERENCE NUMERALS

Figures 1, 2:
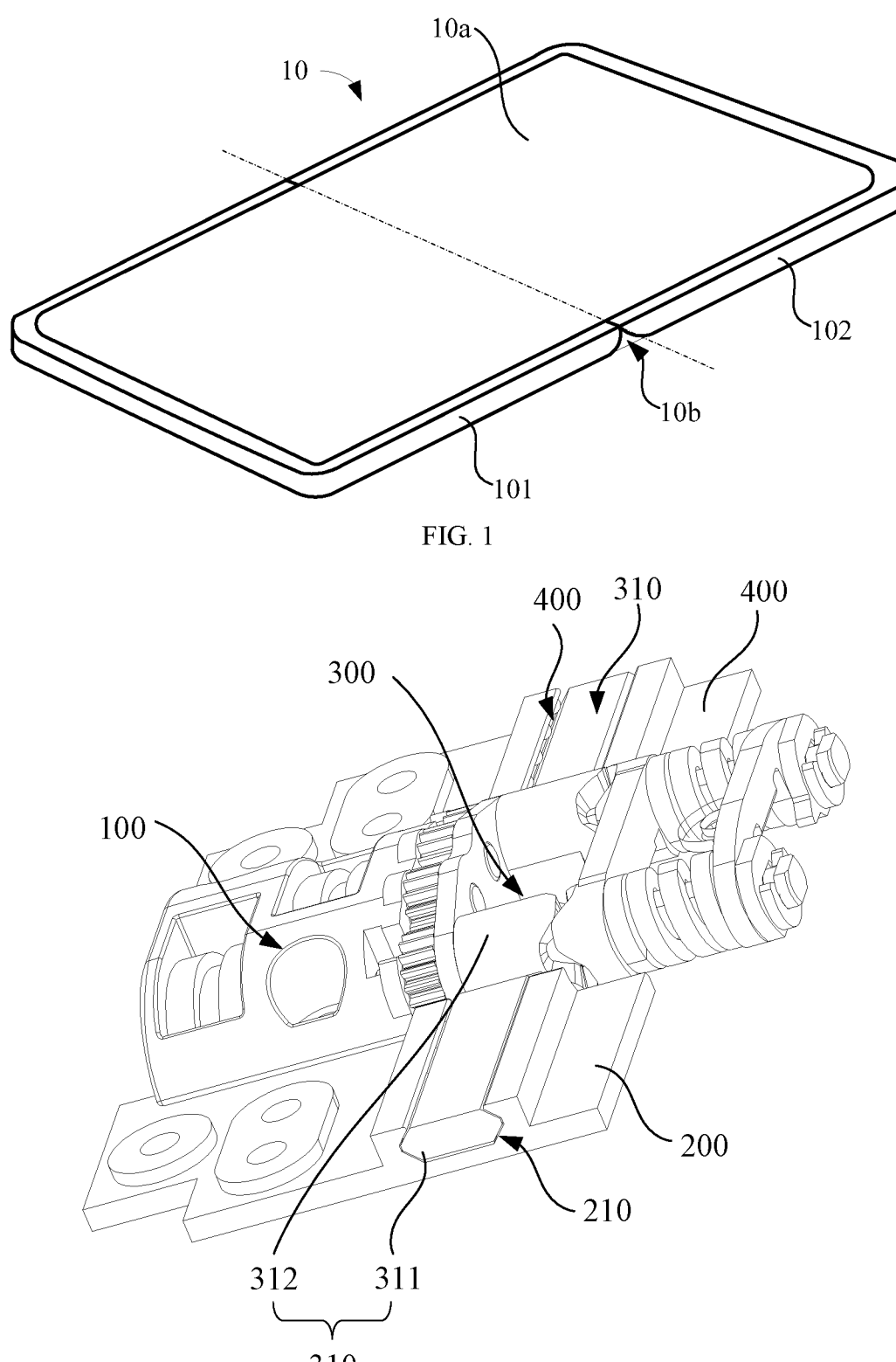
FIG. 1 is a schematic structural diagram of a foldable electronic equipment according to some embodiments of the present disclosure, where the flexible display screen is in an unfolded state.
FIG. 2 is a schematic structural diagram of a folding mechanism according to some embodiments of the present disclosure, where the folding mechanism is in an unfolded state.

10. Foldable electronic equipment; 11. Processing component; 12. Memory; 13. Power supply component; 14. Multimedia component; 15. Audio component; 16. Input/output interface; 17. Sensor component; 18. Communication component; 101. First housing; 102. Second housing; 10a. Flexible display screen; 10b. Folding mechanism; 100. Base frame; 110. Base frame body; 120. First mounting rod; 130. Limiting member; 140. Second mounting rod; 150. Third mounting rod; 200. Support; 210. Sliding groove; 211. Pressure-bearing surface; 212. First limiting surface; 213. Second limiting surface; 214. Anti-detachment groove; 300. Rotor; 310. Sub-rotor; 311. First connecting body; 301. Sliding rail; 3001. First fitting surface; 3002. Second fitting surface; 3003. Third fitting surface; 3004. Anti-detachment portion; 302. First fitting hole; 303. Second fitting hole; 312. Second connecting body; 313. Second friction surface; 304. First groove; 305. First protrusion; 306. Gear body; 320. Friction member; 321. First through hole; 322. Second through hole; 323. First friction surface; 330. Connecting rod; 400. Roller; 410. Rolling body; 500. Limiting cover; 600. Connecting rod component; 700. Elastic component; 710. First elastic member; 720. Second elastic member; 800.

Damping cam; 351. Second groove; 352. Second protrusion; 900. Synchronization component; 910. Synchronization gear.

DETAILED DESCRIPTION

In order to make the purpose, technical solutions and advantages of the present disclosure clearer, the present disclosure will be further described in detail below in conjunction with the accompanying drawings and specific embodiments. It should be understood that the specific embodiments described here are used to explain the present disclosure and do not limit the protection scope of the present disclosure.

Unless otherwise defined, all technical and scientific terms used here have the same meaning as commonly understood by those skilled in the art of the present disclosure. The terms used here in the description of the present disclosure are for the purpose of describing specific embodiments and are not intended to limit the present disclosure.

Electronic equipment such as mobile phones and tablet computers have become indispensable technological products in people's life, study and entertainment, which bring a lot of convenience and fun to people's life. With the development of diversified functions of electronic equipment, there are many types and brands of electronic equipment, such that there are a lot of electronic equipment for the consumers to choose. Simply improving the functional characteristics of electronic equipment cannot satisfy people's requirements for electronic equipment. The aesthetics of the housing structure of electronic equipment has also become an important factor affecting the competitiveness of electronic products. Among electronic equipment with similar functions or performance, the better the durability of the electronic equipment, the more it can attract consumers to make purchase.

As the application of the flexible display screen becomes more and more mature, its application in electronic equipment becomes more and more widespread. For foldable electronic equipment using a flexible display screen, the flexible display screen can be folded in half, and can be easily carried; the flexible display screen has a larger display area after being unfolded, which is increasingly favored by consumers.

However, in related art, the foldable electronic equipment usually uses a folding mechanism to realize that the flexible display screen is unfolded or folded in half. For example, it is needed to use a mechanical folding mechanism to fold the flexible display screen, so as to ensure that no fault occurs during normal use of the flexible display screen and the normal bending of the flexible display screen is not affected; at the same time, the folding mechanism cannot damage the flexible display screen. However, after long-term use of the traditional folding mechanism, the transmission accuracy will drop sharply, resulting in abnormal noise during the movement of the folding mechanism, which is not conducive to improving the durability of the foldable equipment.

Based on this, the present disclosure provides a folding mechanism. The folding mechanism can reduce wear and tear, so that after long-term use of the folding mechanism, the transmission accuracy can still be ensured without easily producing abnormal noise.

In order to better understand the folding mechanism of the present disclosure, it is described through a foldable electronic equipment using the folding mechanism.

Figure 3:
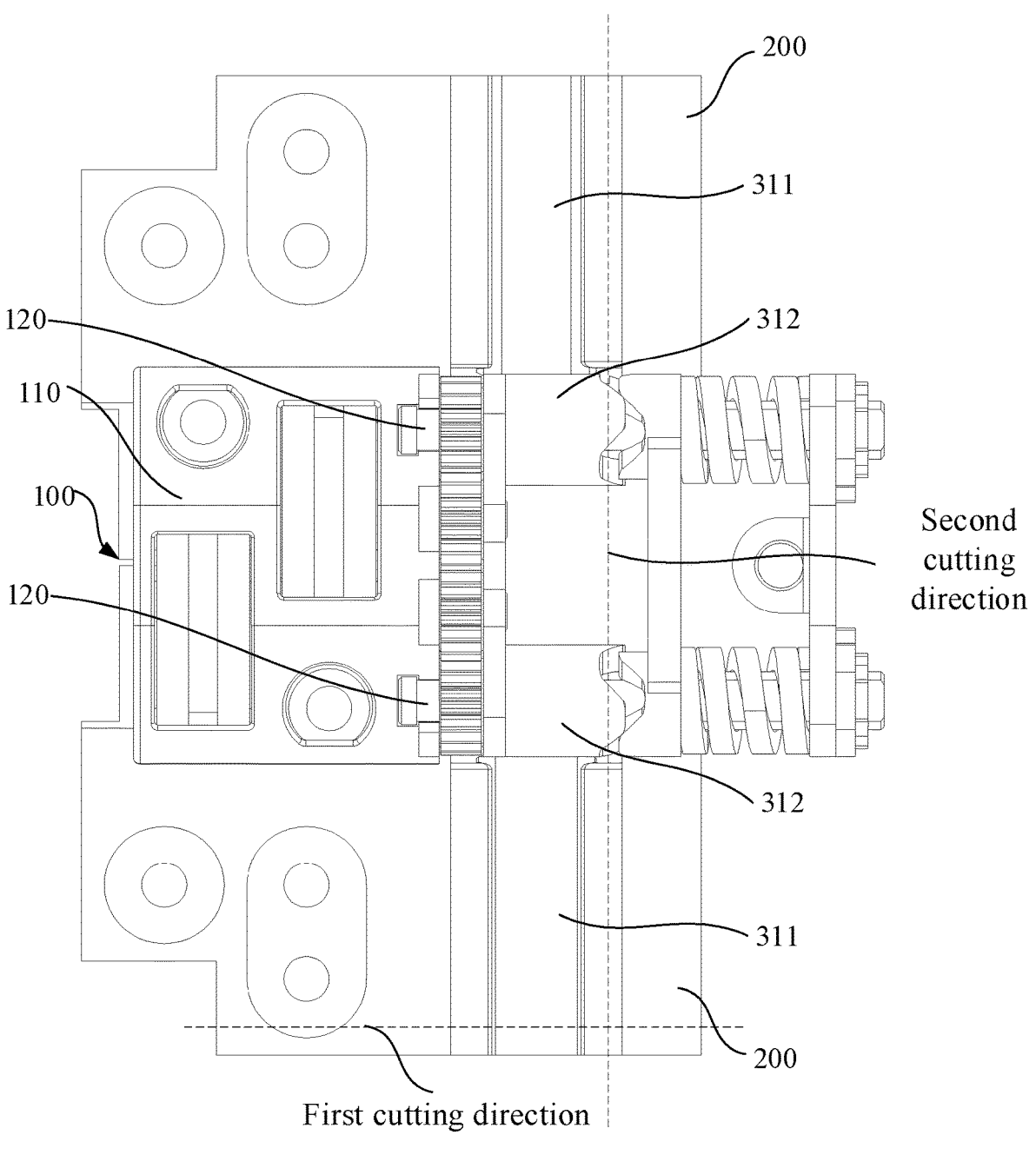
FIG. 3 is a schematic front view of the folding mechanism shown in FIG. 2.
Figure 4:
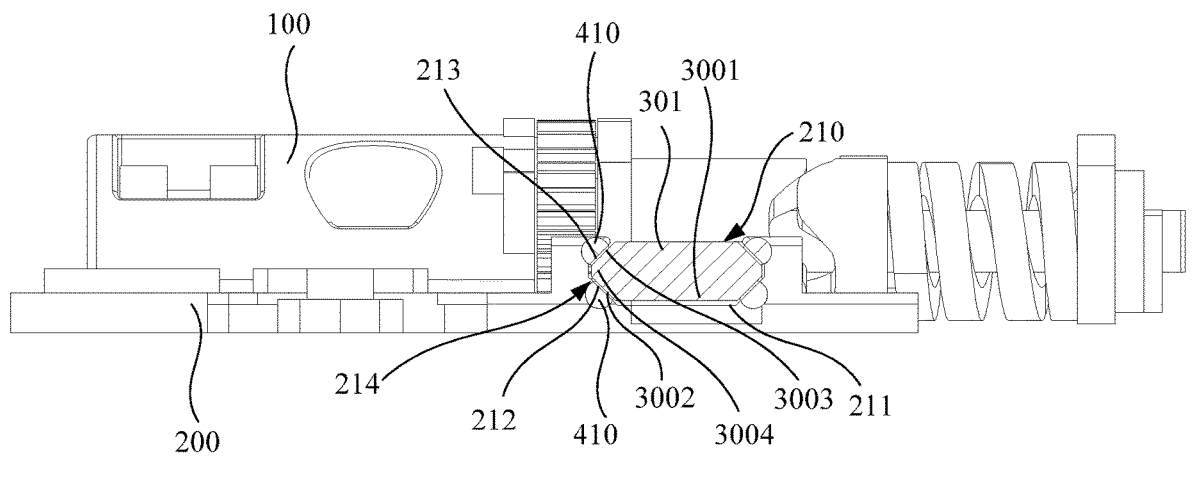
FIG. 4 is a half-sectional schematic view of the folding mechanism shown in FIG. 3 taken along the first cutting direction.
Figure 5:
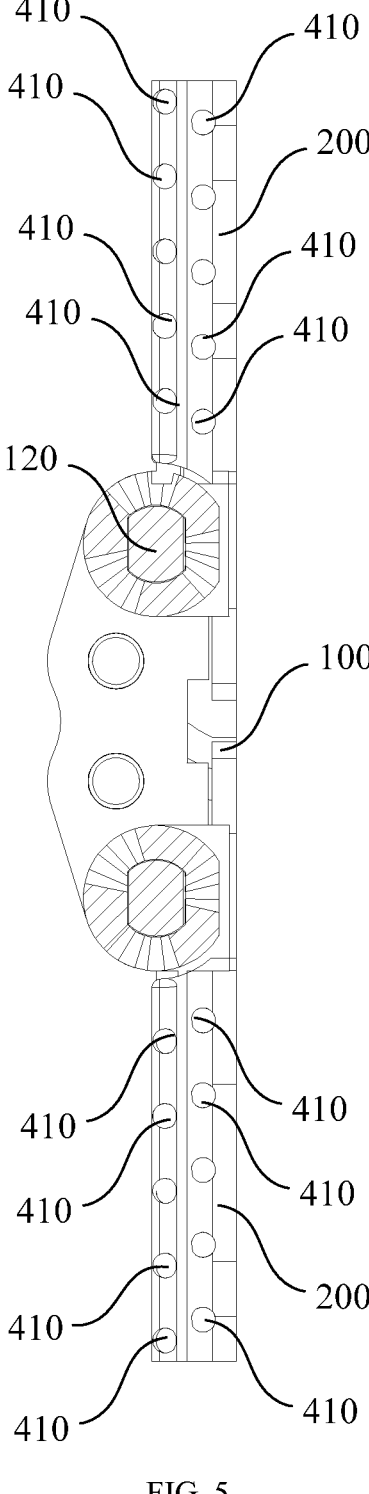
FIG. 5 is a half-sectional schematic view of the folding mechanism shown in FIG. 3 taken along the second cutting direction.

FIG. 1 to FIG. 5 show structural views of a foldable electronic equipment and a folding mechanism according to some embodiments. Among them, FIG. 1 is a schematic structural diagram of a foldable electronic equipment according to some embodiments of the present disclosure, where the flexible display screen is in an unfolded state. FIG. 2 is a schematic structural diagram of a folding mechanism according to some embodiments of the present disclosure, where the folding mechanism is in an unfolded state. FIG. 3 is a schematic front view of the folding mechanism shown in FIG. 2. FIG. 4 is a half-sectional schematic view of the folding mechanism shown in FIG. 3 taken along the first cutting direction. FIG. 5 is a half-sectional schematic view of the folding mechanism shown in FIG. 3 taken along the second cutting direction.

As shown in FIG. 1, in some embodiments of the present disclosure, there is provided a foldable electronic equipment 10, including a flexible display screen 10*a* and a folding mechanism 10*b*. The flexible display screen 10*a* covers the folding mechanism 10*b*. The folding mechanism 10*b* can drive the flexible display screen 10*a* to switch between an unfolded state and a folded-in-half state. When the flexible display screen 10*a* is in the unfolded state, at least partial structure of the folding mechanism 10*b* can support the flexible display screen 10*a*.

Among them, further in combination with FIG. 2, the folding mechanism 10*b* includes a base frame 100, a support 200, a rotor 300 and a roller 400. The support 200 is movably connected to the base frame 100. The rotor 300 includes a sub-rotor 310 that is rotatably connected to the base frame 100. The sub-rotor 310 includes a first connecting body 311 that is slidingly connected to the support 200. The roller 400 is rotatably provided on at least one of the first connecting body 311 or the support 200, so that at least part of the first connecting body 311 is in rolling friction fit with the support 200. The support 200 may include a base provided with a sliding groove or a sliding rail.

When the foldable electronic equipment 10 is in use, the folding mechanism 10*b* can drive the flexible display screen 10*a* to switch between the unfolded state and the folded-in-half state through the support 200. When the flexible display screen 10*a* is in the unfolded state, the folding mechanism 10*b* is in a supporting state and supports the flexible display screen 10*a* through the support 200 and the base frame 100. The support 200 can switch from the supporting state to a folded state, and causes the flexible display screen 10*a* to be in the folded-in-half state. During rotating, the sub-rotor 310 can drive the support 200 to rotate, and cause the first connecting body 311 and the support 200 to slide relative to each other. The roller 400 is rotatably provided in the first connecting body 311 and/or the support 200, so that during sliding of the first connecting body 311 relative to the support 200, at least part of the first connecting body 311 is in rolling friction fit with the support 200 through the roller 400, which can thus effectively reduce the wear and tear during the sliding between the first connecting body 311 and the support 200, and is conducive to maintaining the transmission accuracy between the first connecting body 311 and the support 200, without easily producing abnormal noise. In this way, after long-term use, the foldable electronic equipment 10 will not easily produce abnormal noise or shaking, and has good durability.

It should be noted that when the flexible display screen 10*a* is in the unfolded state, the support 200 is in the supporting state and can support the flexible display screen. When the flexible display screen 10*a* is in the folded-in-half state, the support 200 is in the folded state.

It should be noted that a friction member 320 is sandwiched and provided between two adjacent sub-rotors 310, which includes that the friction member 320 is sandwiched and provided between two sub-rotors 310 in co-directional movement, also includes that the friction member 320 is sandwiched and provided between two sub-rotors 310 moving in opposite directions, and further includes that a part of the friction member 320 is sandwiched and provided between two sub-rotors 310 in co-directional movement and a part of the friction member 320 is sandwiched and provided between two sub-rotors 310 moving in opposite directions.

Optionally, the support 200 is slidingly connected to at least two sub-rotors 310.

As shown in FIG. 2 and FIG. 3, in some embodiments, when the support 200 is in the supporting state, the support 200 is in sliding fit with a part of the base frame 100 to form a supporting surface that supports the flexible display screen 10a. In this way, the flexible display screen 10a can be better supported by the supporting surface in the unfolded state, so as to facilitate the user's viewing or touching.

Figure 11:
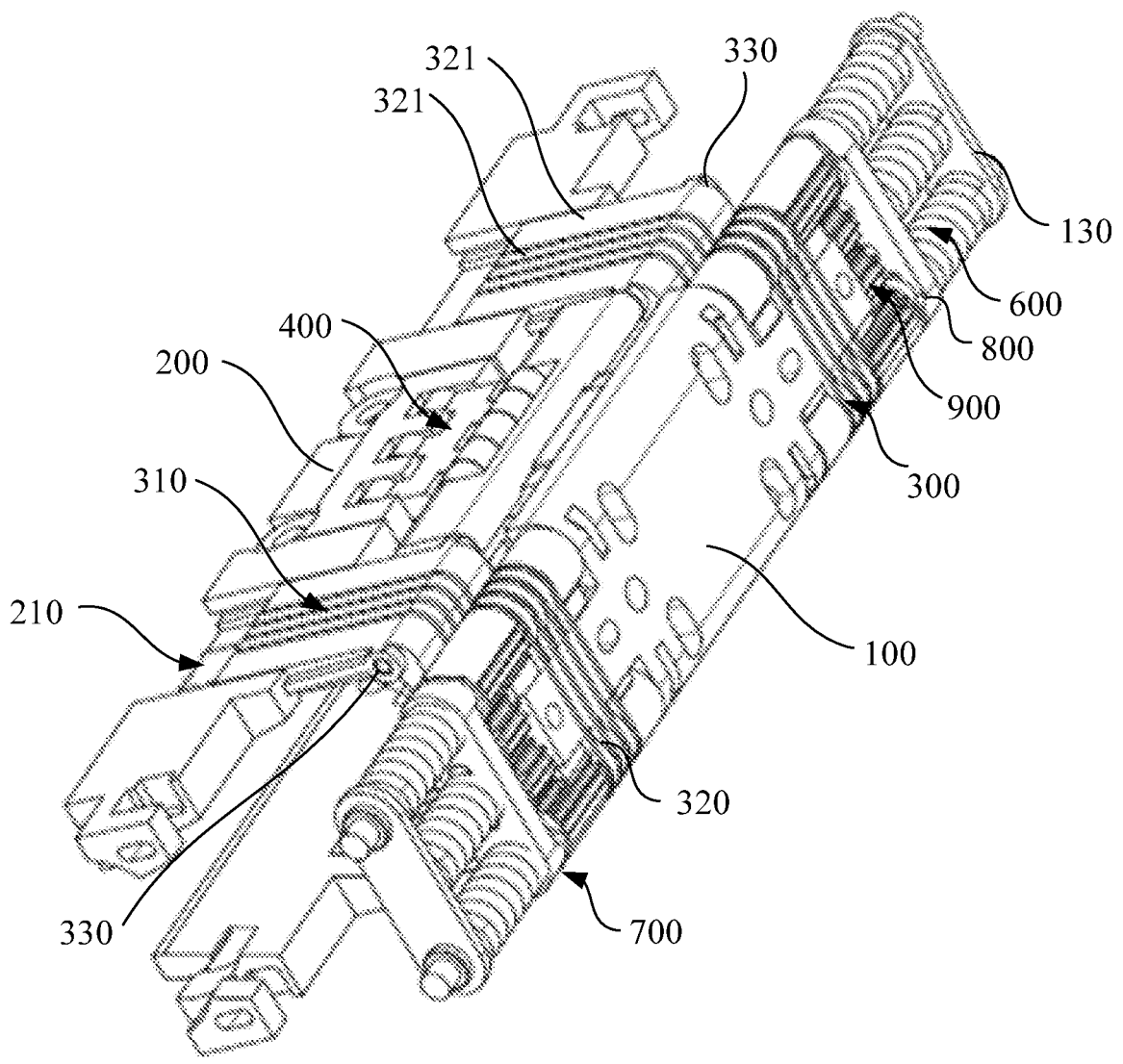
FIG. 11 is a schematic structural diagram of the folding mechanism shown in FIG. 7 in a folded state.

Optionally, as shown in FIG. 11, in some embodiments, when the support 200 is in the folded state, the support 200 and the base frame 100 are provided at an acute angle to form an avoidance space. In this way, it is facilitated for the flexible display screen 10a to bend in the avoidance space, so that the flexible display screen 10a can be folded in half smoothly and is not easily damaged.

It can be understood that during the support 200 switching from the supporting state to the folded state, the support 200 is slidingly connected to the sub-rotor 310 so that the support 200 moves away from the base frame 100 to form an avoidance space.

It should be noted that the sliding connection between the support 200 and the first connecting body 311 can be implemented in various specific ways.

As shown in FIG. 2 and FIG. 4, in some embodiments, one of the support 200 or the first connecting body 311 is provided with a sliding groove 210, and the other is provided with a sliding rail 301 that is in sliding fit with the sliding groove 210, so that the roller 400 is rotatably provided in the sliding groove 210. In this way, through the fit between the sliding groove 210 and the sliding rail 301, the support 200 is in close fit with the first connecting body 311, which is beneficial to reducing the thickness of the folding mechanism 10b.

Optionally, the support 200 is provided with a sliding groove 210, the first connecting body 311 is provided with a sliding rail 301 that is in sliding fit with the sliding groove 210, and at least part of the sliding rail 301 is inserted into the sliding groove 210. In this way, the thickness space of the support 200 is fully utilized to accommodate at least the sliding rail 301, so that the first connecting body 311 is embedded in the support 200, which can reduce the thickness of the folding mechanism 10b, and is beneficial to making the foldable electronic equipment 10 thinner and lighter.

It should be noted that the roller 400 can be provided on any side wall of the first connecting body 311 and/or on any side wall of the sliding groove 210, as long as at least partial rolling friction fit between the side wall of the first connecting body 311 and the side wall of the sliding groove 210 can be realized. In some embodiments, part of the roller 400 is rotatably provided on the side wall of the sliding groove 210, and another part of the roller 400 is in rolling friction fit with the sliding rail 301. In this way, the part of the roller 400 is rotatably embedded in the side wall of the sliding groove 210, and another part of the roller 400 is in rolling friction fit with the sliding rail 301, thus realizing the rolling friction fit between the first connecting body 311 and the support 200.

In addition, it can be understood that the thickness of the support 200 is usually larger than the thickness of the first connecting body 311. Providing a mounting groove on the support 200 to accommodate the roller 400 has less impact on the strength of the support 200 and can fully utilize the thickness space of the support 200 to accommodate the roller 400, so that the structure of the folding mechanism 10b is more compact.

In other embodiments, part of the roller 400 is rotatably provided on the sliding rail 301, and another part of the roller 400 is in rolling friction fit with the side wall of the sliding groove 210. In this way, the part of the roller 400 is rotatably embedded in the side wall of the sliding rail 301, and another part of the roller 400 is in rolling friction fit with the side wall of the sliding groove 210, thus realizing the rolling friction fit between the first connecting body 311 and the support 200.

Based on any embodiment of the sliding rail 301 described above, as shown in FIG. 4, in some embodiments, the sliding groove 210 includes a pressure-bearing surface 211 and a first limiting surface 212 provided adjacent to the pressure-bearing surface 211. The sliding rail 301 includes a first fitting surface 3001 that is in sliding fit with the pressure-bearing surface 211 and a second fitting surface 3002 that is in limiting fit with the first limiting surface 212. Among them, the roller 400 is rotatably provided on at least one of the pressure-bearing surface 211 or the first limiting surface 212. And/or, the roller 400 is rotatably provided on at least one of the first fitting surface 3001 or the second fitting surface 3002. In this way, the pressure-bearing surface 211 is in sliding fit with the first fitting surface 3001, thus realizing that the sliding groove 210 carries the sliding rail 301 to slide. Moreover, the first limiting surface 212 is in limiting fit with the second fitting surface 3002 to limit the deflection of the sliding rail 301 so that the sliding rail 301 can slide along the length direction of the sliding groove 210.

In addition, the roller 400 is rotatably provided on the pressure-bearing surface 211, or on the first limiting surface 212, or on the bearing surface 211 and the first limiting surface 212. And/or, the roller 400 is rotatably provided on the first fitting surface 3001, or on the second fitting surface 3002, or on the first fitting surface 3001 and the second fitting surface 3002, which facilitates realizing the rolling friction fit between the sliding rail 301 and the first connecting body 311, and the implementation manner can be flexibly selected according to actual needs.

Furthermore, as shown in FIG. 4, in some embodiments, there are two first limiting surfaces 212, and the two first limiting surfaces 212 are provided at intervals on two sides of the pressure-bearing surface 211 respectively; two second fitting surfaces 3002 are provided at intervals on two sides of the first fitting surface 3001. In this way, through the limiting fit between two groups of the first limiting surface 212 and the first fitting surface 3001, the sliding rail 301 will not deflect left and right, and can slide along the length direction of the sliding groove 210, so as to improve the sliding connection accuracy between the sub-rotor 310 and the support 200, further improving the transmission accuracy of the folding mechanism 10b.

In any embodiment of the above first limiting surface 212, as shown in FIG. 4, in some embodiments, the sliding groove 210 further includes a second limiting surface 213 in one-to-one correspondence to the first limiting surface 212.

The second limiting surface 213 is adjacent to the first limiting surface 212 and is provided at intervals with the pressure-bearing surface 211 to form an anti-detachment groove 214. The sliding rail 301 further includes a third fitting surface 3003 that is in sliding fit with the second limiting surface 213. The third fitting surface 3003 is provided at intervals with the first fitting surface 3001 to form an anti-detachment portion 3004 that that is in anti-detachment fit with the anti-detachment groove 214. In this way, through the anti-detachment fit between the anti-detachment portion 3004 and the anti-detachment groove 214, the sliding rail 301 will not detach from the sliding groove 210 along the direction away from the pressure-bearing surface 211, which is beneficial to improving the reliability of the fit between the sliding rail 301 and the sliding groove 210.

It should be noted that on a cross-section perpendicular to the sliding direction of the sliding rail 301, the specific shape of the anti-detachment portion 3004 can be various, including but not being limited to, greater than or equal to ½ circle, greater than or equal to ½ ellipse, partial trapezoid, or the like, as long as it can restrict the sliding rail 301 from detaching from the direction away from the pressure-bearing surface 211.

Furthermore, in some embodiments, the roller 400 is rotatably provided on at least one of the pressure-bearing surface 211, the first limiting surface 212, or the second limiting surface 213. And/or, the roller 400 is rotatably provided on at least one of the first fitting surface 3001, the second fitting surface 3002, or the third fitting surface 3003. In this way, it is easy to realize the rolling friction fit between the sliding rail 301 and the first connecting body 311, and the implementation manner can be flexibly selected according to actual needs.

In an example, the roller 400 is rotatably provided in first limiting surface 212 and the second limiting surface 213, and the sliding rail 301 is sandwiched and provided, so that the sliding rail 301 is in clearance fit with the pressure-bearing surface 211. In this way, the sliding rail 301 is in point-to-surface fit with the sliding groove 210 through the roller 400, ensuring that wear and tear are less during movement of the sliding rail 301, which is beneficial to ensuring the transmission accuracy of the long-term movement of the sub-rotor 310 and the load-bearing member.

As shown in FIG. 5, in some embodiments, the roller 400 includes a plurality of rolling bodies 410, at least two rolling bodies 410 are provided as a first group at intervals along the sliding direction of the first connecting body 311, and at least two rows of the first groups are arranged at intervals between the first connecting body 311 and the support 200. In this way, by arranging at least two rows of the first groups at intervals between the first connecting body 311 and the support 200, it is ensured that the first connecting body 311 causes less wear and tear on a single rolling body 410 during movement, effectively preventing effect on the transmission accuracy between the first connecting body 311 and the load-bearing member due to wear and tear of the first rolling body 410.

It should be noted that the rolling body 410 may have a variety of specific shapes, including but being not limited to at least one of an elliptical sphere, a sphere, a cylinder, or a truncated cone cylinder. The plurality of rolling bodies 410 may include rolling bodies with different shapes.

In an example, the rolling body 410 is a sphere, which is easy to assemble.

Figure 6:
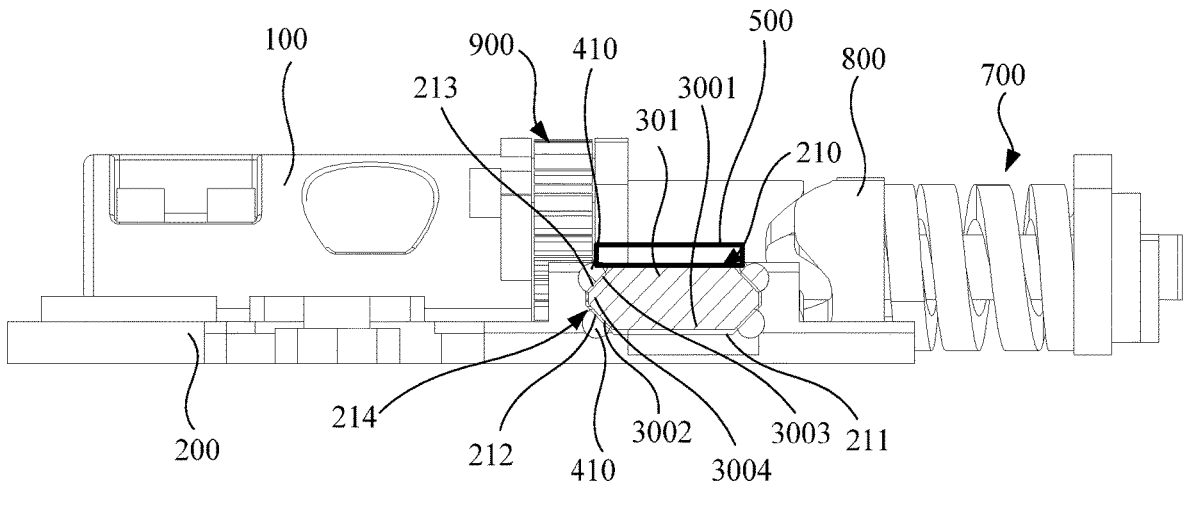
FIG. 6 is a half-sectional schematic view of the folding mechanism according to another embodiment taken along the first cutting direction.

Combined with any embodiment of the above sliding groove 210, as shown in FIG. 6, in some embodiments, the folding mechanism 10b further includes a limiting cover 500. The limiting cover 500 is fixedly connected to the support 200 and is provided to cover the sliding groove 210, so as to restrict the sliding rail 301 from detaching from the sliding groove 210. In this way, part of the sliding rail 301 is accommodated by an accommodation cavity, and the limiting cover 500 is provided to cover the sliding groove 210, so as to restrict the sub-rotor 310 from detaching from the sliding groove 210. It is also convenient to embed part of the sliding rail 301 into the support 200 and reduce the thickness of the folding mechanism 10b, which is beneficial to making the foldable electronic equipment 10 lighter and thinner.

Furthermore, in some embodiments, part of the roller 400 is rotatably provided on the limiting cover 500. In this way, the roller 400 can also be provided on the limiting cover 500, which is easy to assemble and helps reduce the assembly cost.

Figure 8:
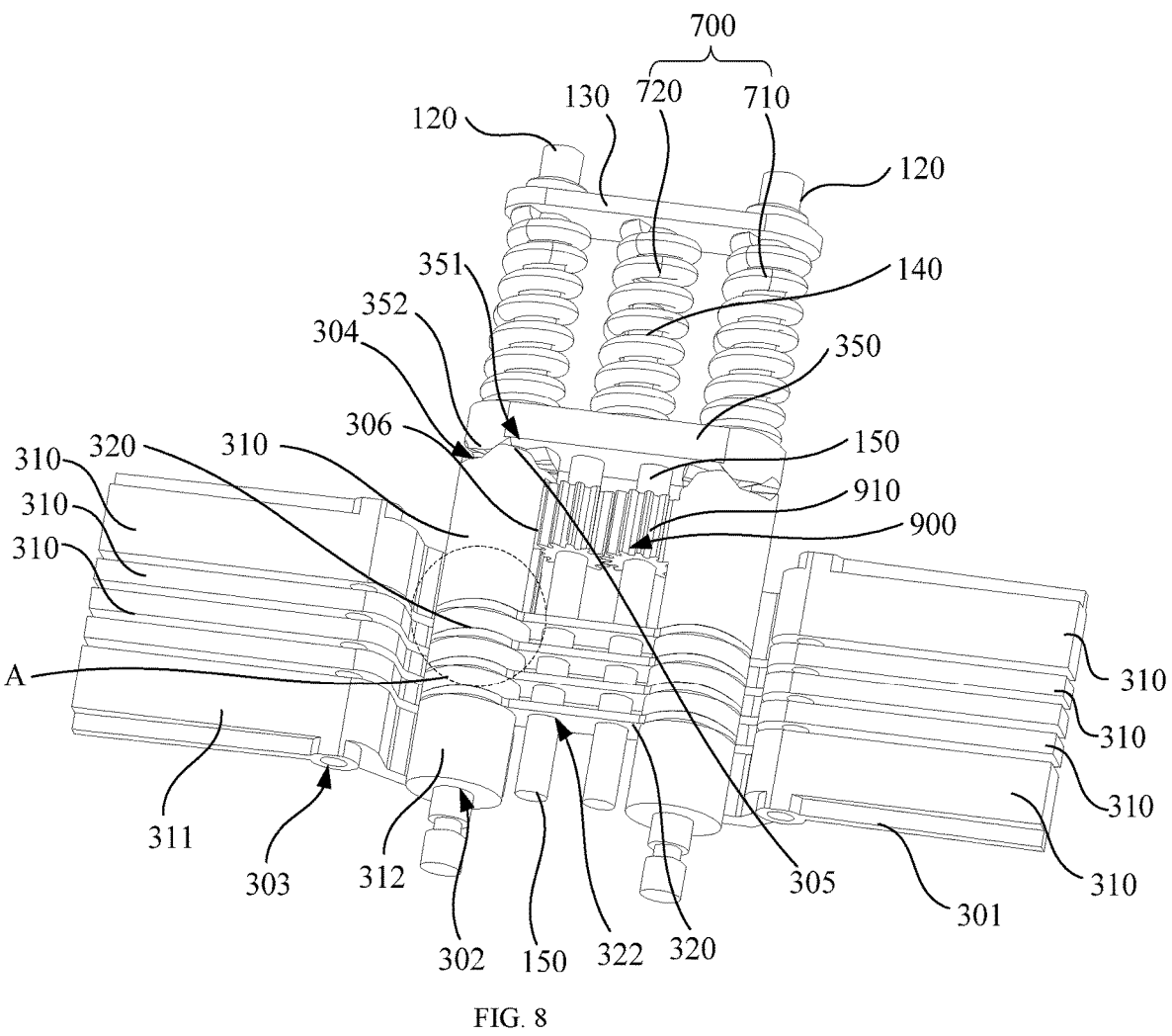
FIG. 8 is a schematic structural diagram of the rotor shown in FIG. 7.

Based on any of the above embodiments, as shown in FIG. 3 and FIG. 8, in some embodiments, the sub-rotor 310 further includes a second connecting body 312 that is rotatably connected to the base frame 100. The second connecting body 312 is connected with the first connecting body 311, and is in a bent shape. In this way, through the fit between the second connecting body 312 and the first connecting body 311, the connecting rod 330 can move around the outer circumference of the first mounting rod 120, and it is easy to realize the spacing adjustment between the support 200 and the base frame 100 during the sliding connection between the support 200 and the first connecting body 311.

In addition, the first connecting body 311 can form a movable supporting plane on the support 200 to support the flexible display screen 10a.

Figure 7:
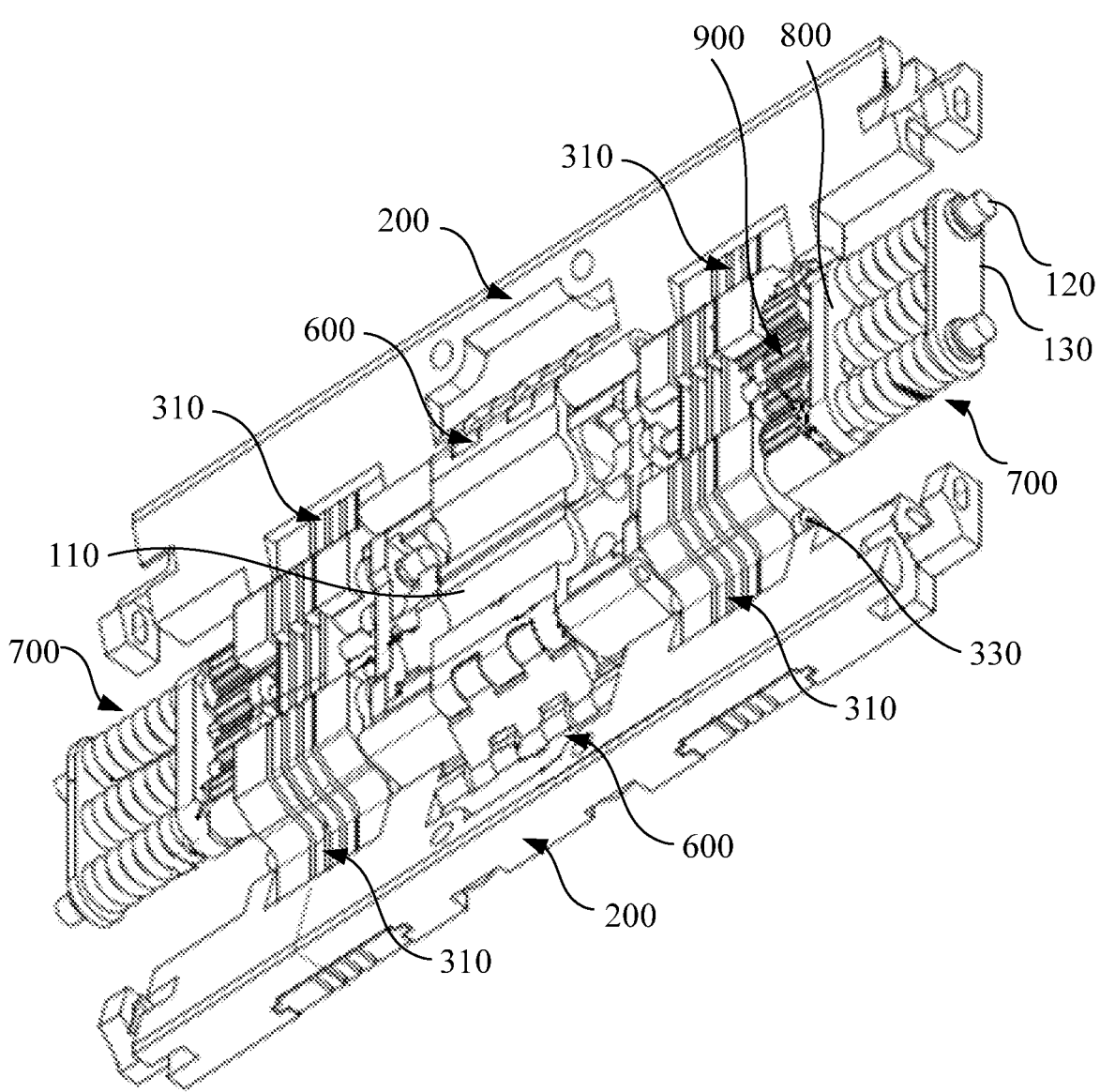
FIG. 7 is a schematic structural diagram of a folding mechanism according to some embodiments of the present disclosure, where the folding mechanism is in an unfolded state.

Based on any of the above embodiments, as shown in FIG. 7, in some embodiments, the folding mechanism 10b further includes a connecting rod component 600, and the support 200 is rotatably connected to the base frame 100 through the connecting rod component 600; the rotor 300 further includes a connecting rod 330 that is rotatably connected to the connecting rod component 600, and the sub-rotor 310 is movably connected to the connecting rod 330. In this way, by providing the connecting rod component 600, it is easy to realize the spacing adjustment between the support 200 and the base frame 100. When the support 200 is in the folded state, through the connecting rod component 600, the spacing between the support 200 and the base frame 100 in the folded state is increased, so that the accommodation space in the embodiments of the present disclosure is increased compared to traditional structures without increasing the hinge thickness, or the avoidance space in the embodiments of the present disclosure can satisfy the requirements for screen accommodation under the circumstance of reducing the hinge thickness. When the support 200 is in the supporting state, the connecting rod component 600 is used to decrease the spacing between the support 200 and the base frame 100 to easily form a tight supporting surface to support the flexible display screen 10a.

It should be noted that the connecting rod component 600 can be implemented in various manners. For example, the connecting rod component 600 has a structure similar to a watch strap. For example, the connecting rod component 600 includes a plurality of connecting rods.

As shown in FIG. 3 and FIG. 7, in some embodiments, the base frame 100 includes a base frame body 110 and a first mounting rod 120 rotatably provided on the base frame body 110. The sub-rotor 310 is rotatably connected to the base frame body 110 through the first mounting rod 120. In this way, the sub-rotor 310 is rotatably connected to the base frame body 110 through the first mounting rod 120, so that the base frame body 110 and the sub-rotor 310 can be provided at intervals along the length direction of the first mounting rod 120, thus preventing the base frame body 110 from interfering the movement of the sub-rotor 310, reducing the avoidance space, and making the structure of the folding mechanism 10b more compact and occupy less space.

Figure 9:
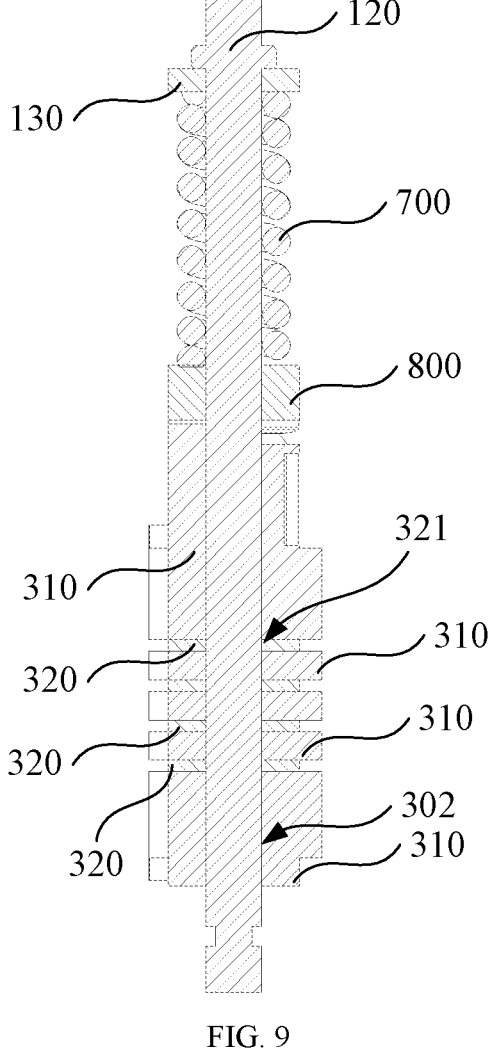
FIG. 9 is a half-sectional schematic view of the rotor shown in FIG. 8 taken along the axis of the first mounting rod.

Based on the above embodiments, combined with FIG. 8 and FIG. 9, in some embodiments, one end of the second connecting body 312 is provided with a first fitting hole 302 that is rotatably connected to the first mounting rod 120. The first fitting hole 302 is in sliding fit with the first mounting rod 120. In this way, through the fit between the first fitting hole 302 and the first mounting rod 120, it is easy to realize that the second connecting body 312 is in rotating connection relative to the base frame 100 and can move along the axial direction of the rotation axis.

Based on the embodiments of the connecting rod 330 described above, combined with FIG. 7, FIG. 9 and FIG. 11, in some embodiments, another end of the second connecting body 312 is provided with a second fitting hole 303 that is rotatably connected to the connecting rod 330. The first fitting hole 302 is in sliding fit with the connecting rod 330. In this way, through the fit between the second fitting hole 303 and the connecting rod 330, it is easy to realize that the first connecting body 311 is in rotating connection relative to the base frame 100 and can move along the axial direction of the rotation axis.

Based on any embodiment of the second connecting body 312 described above, as shown in FIG. 8, in some embodiments, part of the second connecting body 312 has an arc shape. In this way, the first mounting rod 120 can be better avoided, facilitating driving the connecting rod 330 to move around the outer circumference of the first mounting rod 120.

It should be noted that the "second connecting body 312" can be "a part of the sub-rotor 310", that is, the "second connecting body 312" is integrally formed and manufactured with "another part of the sub-rotor 310, such as the first connecting body 311". The "second connecting body 312" can also be an independent member that is separable from "another part of the sub-rotor 310, such as the first connecting body 311", that is, the "second connecting body 312" can be manufactured independently, and then combined with "another part of the sub-rotor 310, such as the first connecting body 311" to form a whole.

Equivalently, "a certain body" or "a certain part" can be part of the corresponding "member", that is, "a certain body" or "a certain part" is integrally formed and manufactured with "another part of the member; it can also be an independent member that is separable from "another part of the member", that is, "a certain body" or "a certain part" can be manufactured independently, and then combined with "another part of the member" to form a whole. The above expression of "a certain body" or "a certain part" in the present disclosure is an embodiment, which is for the convenience of reading and not intended to limit the scope of protection of the present disclosure. As long as the above features are included and the functions are the same, it should be understood as technical solutions equivalent to the present disclosure.

Figure 10:
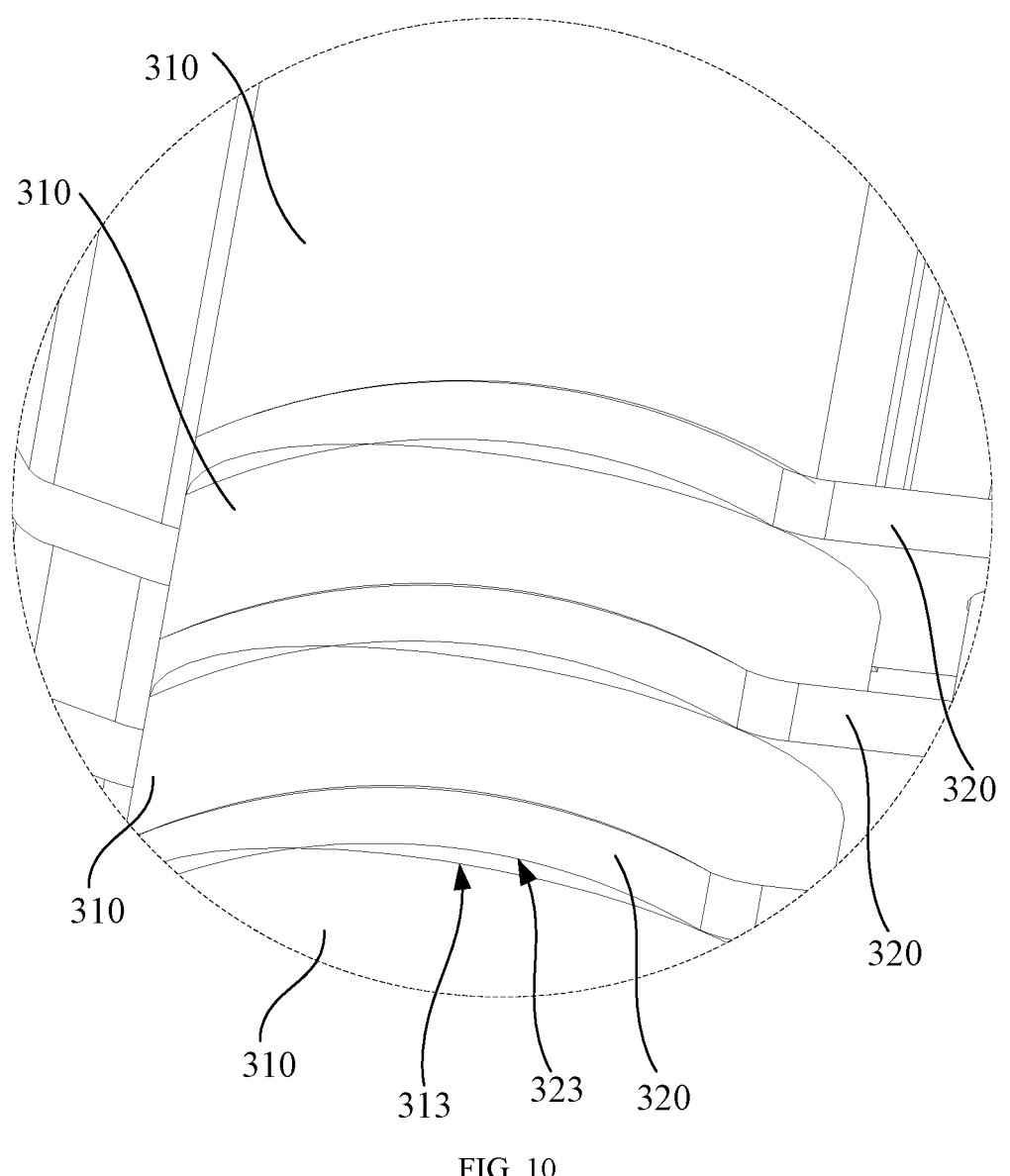
FIG. 10 is an enlarged schematic diagram of region A shown in FIG. 8.

As shown in FIG. 8 and FIG. 10, in some embodiments, the rotor 300 includes a friction member 320 that is in friction fit with the sub-rotor 310. At least two sub-rotors 310 are provided at intervals on the first mounting rod 120 along the length direction of the first mounting rod 120. The friction member 320 is provided on the first mounting rod 120, and is sandwiched and provided between two adjacent sub-rotors 310. In this way, during rotating, the friction member 320 does not rotate with the sub-rotor 310, so that the friction member 320 is in friction fit with the sub-rotor 310, thus increasing the rotational damping of the sub-rotor 310, so that at least two sub-rotors 310 need to overcome a certain rotational damping to rotate. In this way, when the sub-rotor 310 is not driven by a rotational force, the support 200 can be fixed on the base frame 100 to achieve hovering. Therefore, the foldable electronic equipment 10 can hover better during switching between the unfolded state and the folded state, with a better operating feel, thus improving the use experience of the foldable equipment.

In addition, at least two sub-rotors 310 in co-directional movement are used to form a synchronous sub-rotor, and the friction member 320 is used to increase the rotational damping of two adjacent sub-rotors 310. Therefore, the support 200 can be driven to rotate through at least two sub-rotors 310 to ensure the fitting strength of the two. At the same time, the rotational damping of the sub-rotor 310 can be increased.

It should be noted that "hovering" can be understood as that, when subjected to no driving force the sub-rotor 310 may remain in a certain position; when applying a certain rotational force to the sub-rotor 310, the sub-rotor 310 may rotate; when the rotational force is cancelled or decreased, the sub-rotor 310 may not rotate and be fixed at a certain position.

It should be noted that "connection of the support 200 with at least two sub-rotors 310" includes direct connection or indirect connection, as long as the support 200 can be directly or indirectly driven to rotate through the sub-rotors 310. For example, the sub-rotor 310 is slidingly connected to the support 200. For example, the sub-rotor 310 is fixedly connected to the support 200. For example, the sub-rotor 310 drives the support 200 to rotate through other rotating structures.

It can be understood that by adjusting the quantities of the sub-rotor 310 and the friction member 320, the overall damping of the rotor 300 can be flexibly adjusted to achieve the hovering movement of the support 200.

Optionally, the quantity of the sub-rotor 310 are more than three, and at least one friction member 320 is provided on two adjacent sub-rotors 310.

It should be noted that co-directional movement includes coaxial connection, synchronous and co-directional movement, etc.

As shown in FIG. 4, at least two sub-rotors 310 form a group, are in coaxial connection and co-directional movement.

Based on any of the above embodiments of the friction member 320, as shown in FIG. 9, in some embodiments, the friction member 320 is in fixed transmission connection with the first mounting rod 120 through at least two sub-rotors 310, and the friction member 320 is provided on the first mounting rod 120. In this way, it is convenient to use the first mounting rod 120 to integrate the rotor 300, so that the rotor 300 has a more compact structure and takes up less space, which is conducive to making the foldable electronic equipment 10 lighter and thinner.

Based on any of the above embodiments of the friction member 320, combined with the connecting rod 330, as shown in FIG. 7 and FIG. 11, in some embodiments, the connecting rod 330 and the first mounting rod 120 are provided at intervals along the rotating direction of the sub-rotor 310. At least two sub-rotors 310 are movably connected to the connecting rod 330 respectively, so that the at least two sub-rotors 310 rotate synchronously. In this way, through movable connection of the at least two sub-rotors 310 with the connecting rod 330 respectively, it is convenient to achieve synchronous rotation of the at least two sub-rotors 310.

Based on any of the above embodiments of the first mounting rod 120, combined with FIG. 8 and FIG. 9, in some embodiments, the friction member 320 is provided with a first through hole 321; the first mounting rod 120 is inserted into the first through hole 321, and is slidingly connected to the friction member 320. In this way, through the sleeve fit between the first through hole 321 and the first mounting rod 120, it is easy to realize the movement of the friction member 320 relative to axial direction of the first mounting rod 120.

Based on any of the above embodiments of the first mounting rod 120, combined with FIG. 8 and FIG. 9, in some embodiments, the sub-rotor 310 can slide along the length direction of the first mounting rod 120; the friction member 320 is slidingly connected to the first mounting rod 120, and does not rotate relative to the first mounting rod 120. The rotor 300 further includes an elastic component 700 provided on the base frame 100. The elastic component 700 presses at least one of the sub-rotor 310 or the friction member 320. In this way, during the sub-rotor 310 driving the support 200 to switch between the supporting state and the folded state, since the friction member 320 does not rotate, and the friction member 320 and the sub-rotor 310 can be in sliding connection relative to the first mounting rod 120, when the elastic component 700 presses at least one of the sub-rotor 310 or the friction member 320, an elastic pressing force can be used to increase the friction between the sub-rotor 310 and the friction member 320, thus increasing the rotational damping of the sub-rotor 310. In this way, when the sub-rotor 310 is not driven by a rotational force, the support 200 can be fixed on the base frame 100, thus improving the hovering effect of the folding mechanism 10b.

That is, through the elastic component 700, the rotor 300 can elastically and telescopically move along the length direction of the first mounting rod 120, so that the elastic pressing force can be used to increase the frictional resistance between the sub-rotor 310 and the friction member 320.

In other embodiments, the foldable electronic equipment 10 utilizes the rotor 300 so that the flexible display screen 10a can hover at any position between the folded-in-half state and the unfolded state.

It can be understood that hovering damping is provided for the sub-rotor 310 through the fit between the elastic component 700 and the friction member 320, the operation of which is simple. It is easy to adjust the rotational damping of the sub-rotor 310 by adjusting the elastic pressing force of the elastic component 700, so as to satisfy the required hovering effect.

Furthermore, combined with FIG. 6 or FIG. 8, in some embodiments, the folding mechanism 10b further includes a damping cam 800 provided on the first mounting rod 120, and the elastic component 700 abuts against the damping cam 800; at least one sub-rotor 310 is in damping fit with the damping cam 800. In this way, by providing the damping cam 800, the rotational damping of the sub-rotor 310 can be further increased, and the hovering movement of the sub-rotor 310 can be easily realized.

Optionally, combined with FIG. 8, in some embodiments, the sub-rotor 310 that is in damping fit with the damping cam 800 is the sub-rotor 310. The sub-rotor 310 is provided with a first arc-shaped groove and a first protrusion 305 provided at intervals along the outer circumference of its rotation axis. The damping cam 800 is provided with a second arc-shaped groove that matches the first protrusion 305 and a second protrusion 352 that matches the first arc-shaped groove. When the sub-rotor 310 is in a first state, the first protrusion 305 is provided in the second arc-shaped groove, and the second protrusion 352 is provided in the first arc-shaped groove. When the sub-rotor 310 is in a second state, the second protrusion 352 abuts against the first protrusion 305 to press the elastic component 700. In this way, when the sub-rotor 310 is in the first state which corresponds to the rotation process that the flexible display screen 10a switches between the unfolded state and the folded state, the first protrusion 305 is provided in the second arc-shaped groove, the second protrusion 352 is provided in the first arc-shaped groove, and the damping cam 800 generates no or small damping on the sub-rotor 310 to facilitate the rotation of the folding mechanism 10b, as long as it can drive the flexible display screen 10a to move. At this time, the friction member 320 can be used to achieve the hovering effect of rotating immediately and stopping immediately. When the sub-rotor 310 is in the second state which corresponds to that the flexible display screen 10a is in the unfolded or folded state, the second protrusion 352 abuts against the first protrusion 305 to press the elastic component 700, thus increasing the elastic deformation of the elastic component 700 and increasing the force for pressing the friction member 320, and then increasing the rotational damping of the sub-rotor 310, so that the rotor 300 needs to overcome a greater rotational damping to move. That is, the rotor 300 needs a greater driving force to rotate, so that the flexible display screen 10a can be fixed in the unfolded state or the folded state.

Based on any of the above embodiments, combined with FIG. 8 and FIG. 9, in some embodiments, the base frame 100 includes a limiting member 130 that is fixedly connected to the first mounting rod 120. The limiting member 130 and the damping cam 800 are provided at intervals along the length direction of the first mounting rod 120. The elastic component 700 includes at least one first elastic member 710, and the at least one first elastic member 710 is sandwiched and provided between the limiting member 130 and the damping cam 800. In this way, through the fit between the limiting member 130 and the damping cam 800, it is convenient to install and provide the first elastic member 710 on the base frame 100.

Optionally, the first elastic member 710 is sleeved and provided on the first mounting rod 120. In this way, the fit between the two of them is tighter, which is beneficial to making the folding mechanism 10b thinner and lighter.

Furthermore, combined with FIG. 8, in some embodiments, the base frame 100 further includes a second mounting rod 140 fixed and provided between the limiting member 130 and the damping cam 800. The elastic component 700 includes at least one second elastic member 720. At least one second elastic member 720 is sleeved and provided on the second mounting rod 140, and is sandwiched between the limiting member 130 and the damping cam 800. In this way, at least one second elastic member 720 is sleeved and provided on the second mounting rod 140, and is sandwiched between the limiting member 130 and the damping cam 800, so as to make full use of the internal space of the folding mechanism 10b to increase the quantity of the elastic member, thus flexibly adjusting the rotational damping of the sub-rotor 310 and satisfying the hovering effect.

In addition, through the fit among the first mounting rod 120, the second mounting rod 140, the limiting member 130 and the damping cam 800, it is convenient to modularly install the elastic component 700 on the base frame 100, and then install the rotor 300, which is conducive to improving assembly efficiency.

It should be noted that the first elastic member 710 and/or the second elastic member 720 may be implemented in various specific manners. For example, the first elastic member 710 and/or the second elastic member 720 are compression springs or disc springs. For example, the first elastic member 710 and/or the second elastic member 720 are elastic sheets. For example, the first elastic member 710 and/or the second elastic member 720 are elastic gum cylinders (such as silica gel cylinders, rubber cylinders, etc.). It should be noted that the specific types of the first elastic member 710 and/or the second elastic member 720 are not specifically limited in the present disclosure.

In addition, the quantities of the first elastic member 710 and/or the second elastic member 720 are not limited, as long as the sub-rotor 310 can rotate with damping.

Optionally, combined with FIG. 8, in some embodiments, the first elastic member 710 is a compression spring, and is sleeved and provided on the first mounting rod 120. In this way, the structure of the rotor 300 is made more compact. In addition, it is convenient for the elastic force of the first elastic member 710 to directly act on the damping cam 800.

Optionally, combined with FIG. 8, in some embodiments, the second elastic member 720 is a compression spring, and is sleeved and provided on the second mounting rod 140. In this way, the structure of the rotor 300 is made more compact. In addition, it is convenient for the elastic force of the second elastic member 720 to directly act on the damping cam 800.

It should be noted that the rotation range of the sub-rotor 310 for hovering fit can be flexibly designed according to actual needs. For example, it may be 150°, 160°, 165°, 170°, 173°, 175°, 178°, 180°, etc.

It can be understood that the friction member 320, the sub-rotor 310 and the damping cam 800 are made of wear-resistant materials, which is beneficial to increasing the service life of the foldable electronic equipment 10.

It can be understood that the hovering effect of the sub-rotor 310 is achieved through frictional resistance generated by the friction member 320. If the friction coefficient of the friction member 320 is large, wear and tear will occur easily. After wear and tear, the friction resistance generated by the friction member 320 will also become smaller, which is not conducive to providing the foldable electronic equipment 10 with the hovering effect for a long time. Based on any of the above embodiments, combined with FIG. 10, in some embodiments, the friction member 320 is provided with a first friction surface 323, and the sub-rotor 310 is provided with a second friction surface 313 that is in friction fit with the first friction surface 323. At least one of the first friction surface 323 or the second friction surface 313 is provided with an oil storage recess (not shown). In this way, the oil storage recess is used to store lubricating oil to lubricate the friction member 320 and the sub-rotor 310, thus reducing the friction coefficient between the friction member 320 and the sub-rotor 310, improving the wear resistance of the two of them, and then providing the foldable electronic equipment 10 with the hovering effect for a long time.

Combined with FIG. 1 to FIG. 7 and FIG. 11, in some embodiments, the foldable electronic equipment 10 further includes a housing component. The housing component includes a first housing 101 and a second housing 102. The folding mechanism 10b is provided in the housing component. The folding mechanism 10b includes two groups of supports 200 provided at intervals on two sides of the base frame 100 and rotors 300 in one-to-one correspondence to the supports 200. The two groups of supports 200 and rotor 300 move synchronously and reversely relative to the base frame 100. One of the supports 200 is fixedly connected to the first housing 101, and the other one of the supports 200 is fixedly connected to the second housing 102. The flexible display screen 10a is provided to cover the first housing 101, the folding mechanism 10b and the second housing 102. In this way, when the foldable electronic equipment 10 is in use, the rotors 300 on two sides of the base frame 100 rotate around the base frame 100, and the rotors 300 can drive the supports 200 to rotate, so that the first housing 101 and the second housing 102 move synchronously and reversely to switch the flexible display screen 10a between the unfolded state and the folded state.

Based on the above embodiments, combined with FIG. 7 and FIG. 11, in some embodiments, the rotation component 300 and the support 200 in one-to-one correspondence to it form a second group. The folding mechanism 10b further includes a synchronization component 900. Two second groups are provided on two sides of the base frame 100 and move synchronously through the synchronization component 900, so that the two supports 200 are in the folded state or the supporting state. In this way, the synchronization component 900 is used to facilitate the synchronous rotation of the two second groups of sub-rotors 310, so as to realize the synchronous movement of the two groups of sub-rotors 310 to drive the support 200 to switch between the folded state and the supporting state. Moreover, the spacing between the two groups of sub-rotors 310 can be flexibly adjusted.

It should be noted that the synchronization component 900 can be implemented in various manners, including but not limited to meshing transmission of the synchronization gear 910, and other manners of implementing synchronous rotation, such as a pulley mechanism, a sprocket mechanism, and so on.

Furthermore, as shown in FIG. 3, in some embodiments, the synchronization component 900 includes at least one synchronization gear 910, and the sub-rotor 310 includes a gear body 306 meshing with the at least one synchronization gear 910. In this way, the gear body 306 is directly or indirectly meshed with the at least one pair of synchronization gears 910 to achieve synchronous and reverse rotation of the two groups of sub-rotors 310. The structure is compact, and it is easy to implement.

Combined with the above embodiments of the first mounting rod 120, as shown in FIG. 8, in an example, the base frame 100 includes two first mounting rods 120 provided at intervals. A group of sub-rotors 310 is provided on one first mounting rod 120, the other group of sub-rotors 310 is provided on the other first mounting rod 120. The synchronization component 900 is provided between the two first mounting rods 120. The friction member 320 is provided on the two first mounting rods 120. One end of the friction member 320 is sandwiched and provided between one group of sub-rotors 310, and the other end of the friction member 320 is sandwiched and provided between the other group of sub-rotors 310.

Furthermore, combined with FIG. 8, in some embodiments, the base frame 100 further includes a third mounting rod 150 sandwiched and provided between the two groups of rotors 300. The synchronization gear 910 is rotatably connected to the third mounting rod 150. In this way, the third mounting rod 150 is used to facilitate providing the synchronization gear 910 rotatably on the base frame 100.

Combined with FIG. 8, in an example, the friction member 320 is provided with a second through hole 322. The third mounting rod 150 is inserted into the second through hole 322, and is slidingly connected to the friction member 320. In this way, through the sleeving fit between the second through hole 322 and the third mounting rod 150, it is easy to realize the movement of the friction member 320 relative to the axial direction of the third mounting rod 150.

In addition, the friction member 320 is connected with two first mounting rods 120 and the third mounting rod 150 respectively. The connection is reliable and achieves friction fit with two groups of sub-rotors 310, which is beneficial to reducing the assembly process and improving the assembly efficiency of the rotor 300.

In other embodiments, the friction members 320 that are in friction fit with a group of sub-rotors 310 form a group. The friction members 320 that are in friction fit with the other group of sub-rotors 310 form the other group. Two groups of friction members 320 are installed and provided on the base frame 100 respectively.

It can be understood that the rotor 300 combines the rotor 300, the elastic component 700 and the synchronization component 900 into a module through the base frame 100, the module is then assembled with the base frame 100 through the first mounting rod 120 and the third mounting rod 150, realizing modular installation in the folding mechanism 10*b*, which is beneficial to improving assembly efficiency.

It should be noted that the first mounting rod 120 and/or the third mounting rod 150 can be installed on the base frame 100 in various manners, including but not limited to shaft connection, screw connection, buckle, riveting, welding, etc.

It should be noted that the "third mounting rod 150" can be one part of the module "base frame 100"; that is, it is assembled into a module with "other members of the base frame 100", and then modularly assembled. It can also be relatively independent from "other members of the base frame 100", and can be installed separately; that is, it can form a whole with "other members of the base frame 100" in the present device.

It should be noted that the "connecting rod 330" can be one part of the module "rotor 300"; that is, it is assembled into a module with "other members of the rotor 300", and then modularly assembled. It can also be relatively independent from "other members of the rotor 300", and can be installed separately; that is, it can form a whole with "other members of the rotor 300" in the present device.

Equivalently, the members included in the "component", "assembly", "mechanism" and "equipment" of the present disclosure can also be flexibly combined, that is, for modular production according to actual conditions, and for modular assembly as an independent module. They also can be assembled separately, and form a module in the present device. The division of the above members in the present disclosure is one of the embodiments, for the convenience of reading, and is not intended to limit the protection scope of the present disclosure. As long as the above members are included and have the same functions, it should be understood as the technical solution equivalent to the present disclosure.

It should be noted that the foldable electronic equipment 10 in any of the above embodiments includes, but is not limited to, a foldable display equipment, a foldable smartphone, a foldable tablet computer, etc.

Figure 12:
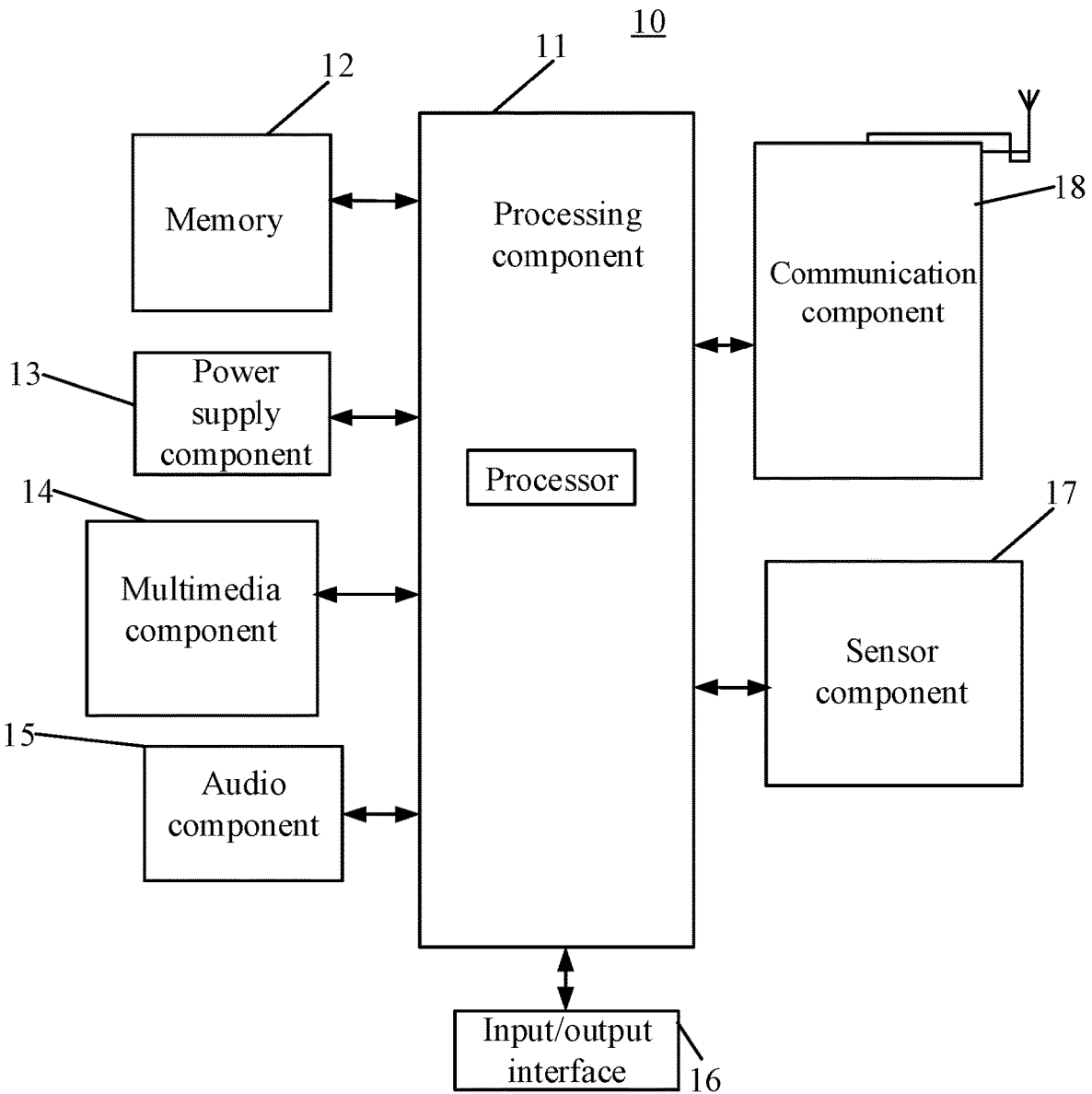
FIG. 12 is a schematic diagram of the internal hardware structure of the foldable electronic equipment according to some embodiments of the present disclosure.

Referring to FIG. 12, in some embodiments, the foldable electronic equipment 10 may further include one or more of the following components: a processing component 11, a memory 12, a power supply component 13, a multimedia component 14, an audio component 15, and an input/output interface 16, a sensor component 17, and a communication component 18.

The processing component typically controls the overall operation of the foldable electronic equipment, such as operations associated with display, phone calls, data communications, camera operations, and recording operations. The processing component may include one or more processors to execute instructions to complete all or part of the steps of the above method. Additionally, the processing component may include one or more modules that facilitate interaction between the processing component and other components. For example, the processing component may include a multimedia module to facilitate interaction between the multimedia component and the processing component.

The memory is configured to store various types of data to support operations in the foldable electronic equipment. Examples of such data include instructions for any application or method operated on the foldable electronic equipment, contact data, phonebook data, messages, pictures, videos, etc. The memory can be implemented by any type of volatile or non-volatile storage equipment or a combination of them, such as static random access memory (SRAM), electrically erasable programmable read-only memory (EEPROM), erasable programmable memory read-only memory (EPROM), programmable read-only memory (PROM), read-only memory (ROM), magnetic memory, flash memory, magnetic disk, or optical disk.

The control motherboard includes the processing component and the memory.

The power supply component provides power to various components of the foldable electronic equipment. The power supply component may include a power management system, one or more power supplies, and other components associated with generating, managing, and distributing power to the foldable electronic equipment.

The multimedia component includes the display module of the present disclosure to facilitate human-computer interaction. If the display module includes a touch panel, the display module may be implemented as a touch screen to receive input signals from the user. The touch panel includes one or more touch sensors to sense touching, sliding, and gestures on the touch panel. A touch sensor can not only sense the boundary of a touching or sliding operation, but also detect the duration and pressure associated with the touching or sliding operation. In some embodiments, the multimedia component includes a front-facing camera and/or a rear-facing camera. When the foldable electronic equipment is in an operation mode, such as a shooting mode or a video mode, the front-facing camera and/or the rear-facing camera can receive external multimedia data. Each of the front-facing camera and the rear-facing camera can be a fixed optical lens system, or has a focal length and an optical zoom capability.

The audio component is configured to output and/or input audio signals. For example, the audio component includes a microphone (MIC) configured to receive an external audio signal when the foldable electronic equipment is in an operation mode, such as a call mode, a recording mode, and a voice recognition mode. The received audio signal may be further stored in memory or sent via the communication component. In some embodiments, the audio component further includes a speaker for outputting audio signals.

The input/output interface provides an interface between the processing component and a peripheral interface module. The above peripheral interface module can be a keyboard, a click wheel, a button, etc. The button may include, but is not limited to, a home button, a volume button, a start button, and a lock button.

The sensor component includes one or more sensors for providing status assessment of various aspects of the foldable electronic equipment. For example, the sensor component may detect the open/closed state of the foldable electronic equipment, the relative positioning of components; for example, the components are a display and a keypad of the foldable electronic equipment. The sensor component may also detect position change of the foldable electronic equipment or of a component of the foldable electronic equipment, the presence or absence of user contact with the foldable electronic equipment, orientation or acceleration/deceleration of the foldable electronic equipment, and temperature change of the foldable electronic equipment. The sensor component may include a proximity sensor configured to detect the presence of a nearby object without any physical contact. The sensor component may also include a photosensitive element, such as a CMOS or CCD image sensor, for use in imaging applications. In some embodiments, the sensor component may also include an acceleration sensor, a gyroscope sensor, a magnetic sensor, a pressure sensor, or a temperature sensor.

The communication component is configured to facilitate wired or wireless communication between the foldable electronic equipment and other equipment. The foldable electronic equipment can access a wireless network based on a communication standard, such as WiFi, 2G, 3G, 4G or 6G, or a combination of them. In an exemplary embodiment, the communication component receives broadcast signals or broadcast related information from an external broadcast management system via a broadcast channel. In an exemplary embodiment, the communication component further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

The present disclosure provides a folding mechanism and a foldable electronic equipment. The folding mechanism can reduce wear and tear, so that after long-term use of the folding mechanism, the transmission accuracy can still be ensured without easily producing abnormal noise. The folding mechanism is used in a foldable electronic equipment and can improve the durability of the foldable equipment.

The technical solution is as follows.

According to a first aspect of embodiments of the present disclosure, there is provided a folding mechanism, including a base frame, a support, a rotor and a roller. The support is movably connected to the base frame. The rotor includes a sub-rotor that is rotatably connected to the base frame, and the sub-rotor includes a first connecting body that is slidingly connected to the support. The roller is rotatably provided on at least one of the first connecting body or the support, so that at least part of the first connecting body is in rolling friction fit with the support.

The technical solutions provided by the embodiments of the present disclosure may include the following beneficial effects.

When the folding mechanism is in use, during rotation of the sub-rotor relative to the base frame, the sub-rotor can drive the support to rotate and cause the first connecting body and the support to slide relative to each other. The roller is rotatably provided in the first connecting body and/or the support, so that during sliding of first connecting body relative to the support, at least part of the first connecting body is in rolling friction fit with the support through the roller, which can thus effectively reduce wear and tear during sliding between the first connecting body and the support, and is conducive to maintaining the transmission accuracy between the first connecting body and the support without easily producing abnormal noise. In this way, the folding mechanism can reduce wear and tear, so that after long-term use of the folding mechanism, the transmission accuracy can still be ensured without easily producing abnormal noise.

The technical solution of the present disclosure is further described below:

In some embodiments, one of the support and the first connecting body is provided with a sliding groove, and the other one of the support and the first connecting body is provided with a sliding rail that is in sliding fit with the sliding groove, so that the roller is rotatably provided in the sliding groove.

In some embodiments, a part of the roller is rotatably provided on a side wall of the sliding groove, and another part of the roller is in rolling friction fit with the sliding rail.

and/or, a part of the roller is rotatably provided on the sliding rail, and another part of the roller is in rolling friction fit with a side wall of the sliding groove.

In some embodiments, the sliding groove includes a pressure-bearing surface and a first limiting surface provided adjacent to the pressure-bearing surface; the sliding rail includes a first fitting surface that is in sliding fit with the pressure-bearing surface and a second fitting surface that is in limiting fit with the first limiting surface;

where, the roller is rotatably provided on at least one of the pressure-bearing surface or the first limiting surface; and/or, the roller is rotatably provided on at least one of the first fitting surface or the second fitting surface.

In some embodiments, a quantity of the first limiting surface is one or more, and at least one first limiting surface is provided at intervals on at least one side of the pressure-bearing surface.

In some embodiments, the sliding groove further includes a second limiting surface in one-to-one correspondence to the first limiting surface; the second limiting surface is adjacent to the first limiting surface, and the second limiting surface is provided at intervals with the pressure-bearing surface to form an anti-detachment groove; the sliding rail further includes a third fitting surface that is in sliding fit with the second limiting surface, and the third fitting surface is provided at intervals with the first fitting surface to form an anti-detachment portion that is in anti-detachment fit with the anti-detachment groove.

In some embodiments, the roller is rotatably provided on at least one of the pressure-bearing surface, the first limiting surface or the second limiting surface; and/or, the roller is rotatably provided on at least one of the first fitting surface, the second fitting surface or the third fitting surface.

In some embodiments, the sliding groove is provided on the support, and the sliding rail is provided on the first connecting body.

In some embodiments, the folding mechanism further includes a limiting cover, the limiting cover is fixedly connected to the support, and the limiting cover is provided to cover the sliding groove so as to restrict the sliding rail from detaching from the sliding groove.

In some embodiments, a part of the roller is rotatably provided on the limiting cover.

In some embodiments, the roller includes at least one rolling body, at least two rolling bodies are provided at intervals as a first group along a sliding direction of the first connecting body, at least two rows of first groups are arranged at intervals between the first connecting body and the support.

In some embodiments, the sub-rotor further includes a second connecting body that is rotatably connected to the base frame; the second connecting body is connected with the first connecting body, and the second connecting body is in a bent shape.

In some embodiments, the folding mechanism further includes a connecting rod component, and the support is rotatably connected to the base frame through the connecting rod component; the rotor further includes a connecting rod that is rotatably connected to the connecting rod component, and the sub-rotor is movably connected to the connecting rod.

In some embodiments, the base frame includes a base frame body and a first mounting rod that is rotatably provided on the base frame body; the sub-rotor is rotatably connected to the base frame body through the first mounting rod.

In some embodiments, the rotor includes a friction member that is in friction fit with the sub-rotor, and at least two sub-rotors are provided at intervals on the first mounting rod along a length direction of the first mounting rod; the friction member is provided on the first mounting rod, and the friction member is sandwiched and provided between two adjacent sub-rotors.

In some embodiments, the sub-rotor is able to slide along the length direction of the first mounting rod; the rotor further includes an elastic component provided on the base frame, and the elastic component presses at least one of the sub-rotor or the friction member.

According to a second aspect of the embodiments of the present disclosure, there is further provided a foldable electronic equipment, including a flexible display screen and a folding mechanism according to any one of the above embodiments. The flexible display screen is folded or unfolded through the folding mechanism.

The technical solutions provided by the embodiments of the present disclosure may include the following beneficial effects.

The foldable electronic equipment uses the folding mechanism according to any one of the above embodiments, and the flexible display screen is provided to cover the support. When the foldable electronic equipment is in use, the folding mechanism can drive the flexible display screen to switch between an unfolded state and a folded state through the support. When the flexible display screen is in the unfolded state, the folding mechanism is in a supporting state and supports the flexible display screen through the support and the base frame. The support can switch from the supporting state to the folded state, and causes the flexible display screen to be in the folded state. During rotating, the sub-rotor can drive the support to rotate and cause the first connecting body and the support to slide relative to each other. The roller is rotatably provided in the first connecting body and/or the support, so that during sliding of the first connecting body relative to the support, at least part of the first connecting body is in rolling friction fit with the support through the roller, which can thus effectively reduce wear and tear during sliding between the first connecting body and the support, and is conducive to maintaining the transmission accuracy between the first connecting body and the support without easily producing abnormal noise. In this way, after long-term use, the foldable electronic equipment will not easily produce abnormal noise or shaking, and has good durability.

In the description of the present disclosure, it should be understood that the orientation or positional relationship indicated by the terms "center", "longitudinal", "transverse", "length", "width", "thickness", "upper", "lower", "front", "back", "left", "right", "vertical", "horizontal", "top", "bottom", "inside", "outside", "clockwise", "counterclockwise", "axial", "radial", "circumferential", or the like, is based on the orientation or positional relationship shown in the drawings, which is for the convenience of describing the present disclosure and simplifying the description, does not indicate or imply that the referred device or element must have a specific orientation or be constructed and operated in a specific orientation, and therefore cannot to be construed as limitations on the present disclosure.

Furthermore, the terms "first", "second", or the like, are used for the purpose of description and cannot be understood as indicating or implying relative importance or implicitly indicating the quantity of the indicated technical features. Thus, the features defined by "first", "second", or the like, may explicitly or implicitly include at least one of the features. In the description of the present disclosure, unless otherwise explicitly and specifically limited, "plurality" means at least two, such as two, three, etc.

In the present disclosure, unless otherwise explicitly stated and limited, the terms "installation", "connection", "communication", "fixing" or other terms should be understood in a broad sense. For example, it can be a fixed connection or a detachable connection, or formed into a whole; it can be a mechanical connection or an electrical connection; it can be a direct connection or an indirect connection through an intermediate medium; it can be an internal communication between two elements or an interactive relationship between two elements, unless otherwise explicitly limited. For those of ordinary skill in the art, the specific meanings of the above terms in the present disclosure can be understood according to specific conditions.

In the present disclosure, unless otherwise explicitly stated and limited, a first feature being "on" or "below" a second feature may mean that the first feature and the second feature are in direct contact, or the first feature and second feature are in indirect contact through an intermediate medium. Furthermore, the first feature being "above", "over" and "on top of" the second feature may mean that the first feature is directly above or diagonally above the second feature, or means that the horizontal height of the first feature is greater than the horizontal height of the second feature. The first feature being "below", "beneath" and "under" the second feature may mean that the first feature is directly below or diagonally below the second feature, or means that the horizontal height of the first feature is smaller than the horizontal height of the second feature.

It should be noted that when an element is referred to as being "fixed to", "provided on", "anchored to" or "mounted on" another element, it can be directly on another element or there may be an intervening element. When an element is considered to be "connected" to another element, it can be directly connected to another element or there may be an intervening element at the same time. Furthermore, when an element is considered to be "in in fixed connection" with another component, the two of them can be fixed in a detachable connection, or they can be fixed in a non-detachable connection, such as socketing, snapping, one-piece forming fixation, welding, or the like, which can be implemented in traditional technology, and will not be repeated in detail here.

The technical features of the above embodiments can be combined in any way. To simplify the description, not all possible combinations of the technical features in the above embodiments are described. However, as long as there is no contradiction in the combination of these technical features, they should be considered to be within the scope recorded in the specification.

The above embodiments express several implementation manners of the present disclosure, and their descriptions are relatively specific and detailed, but they should not be construed as limitation to the scope of the present disclosure. It should be noted that for those of ordinary skill in the art, several modifications and improvements can be made without departing from the inventive concept of the present disclosure, and these all fall within the protection scope of the present disclosure.

What is claimed is:

1. A folding mechanism, comprising:
a base frame;
a support, movably connected to the base frame;
a rotor, comprising a sub-rotor that is rotatably connected to the base frame, wherein the sub-rotor comprises a first connecting body that is slidingly connected to the support; and
a roller, rotatably provided on at least one of the first connecting body or the support, thereby at least part of the first connecting body is in rolling friction fit with the support;
wherein one of the support and the first connecting body is provided with a sliding groove, and the other one of the support and the first connecting body is provided with a sliding rail that is in sliding fit with the sliding groove, and wherein the roller is rotatably provided in the sliding groove.

2. The folding mechanism according to claim 1, wherein a first part of the roller is rotatably provided on a side wall of the sliding groove, and a second part of the roller is in rolling friction fit with the sliding rail.

3. The folding mechanism according to claim 1, wherein a first part of the roller is rotatably provided on the sliding rail, and a second part of the roller is in rolling friction fit with a side wall of the sliding groove.

4. The folding mechanism according to claim 1, wherein the sliding groove comprises a pressure-bearing surface and a first limiting surface provided adjacent to the pressure-bearing surface; and wherein the sliding rail comprises a first fitting surface that is in sliding fit with the pressure-bearing surface and a second fitting surface that is in limiting fit with the first limiting surface.

5. The folding mechanism according to claim 4, wherein the roller is rotatably provided on at least one of the pressure-bearing surface, the first limiting surface, the first fitting surface or the second fitting surface.

6. The folding mechanism according to claim 4, wherein a quantity of the first limiting surface is two, and at least one first limiting surface is provided at intervals on at least one side of the pressure-bearing surface.

7. The folding mechanism according to claim 4, wherein the sliding groove further comprises a second limiting surface in one-to-one correspondence to the first limiting surface; the second limiting surface is adjacent to the first limiting surface, and the second limiting surface is provided at intervals with the pressure-bearing surface to form an anti-detachment groove; the sliding rail further comprises a third fitting surface that is in sliding fit with the second limiting surface, and the third fitting surface is provided at intervals with the first fitting surface to form an anti-detachment portion that is in anti-detachment fit with the anti-detachment groove.

8. The folding mechanism according to claim 7, wherein the roller is rotatably provided on at least one of the pressure-bearing surface, the first limiting surface or the second limiting surface.

9. The folding mechanism according to claim 7, wherein the roller is rotatably provided on at least one of the first fitting surface, the second fitting surface or the third fitting surface.

10. The folding mechanism according to claim 1, wherein the sliding groove is provided on the support, and the sliding rail is provided on the first connecting body.

11. The folding mechanism according to claim 10, wherein the folding mechanism further comprises a limiting cover, the limiting cover is fixedly connected to the support, and the limiting cover is provided to cover the sliding groove, thereby restricting the sliding rail from detaching from the sliding groove.

12. The folding mechanism according to claim 11, wherein a part of the roller is rotatably provided on the limiting cover.

13. The folding mechanism according to claim 1, wherein the roller comprises a plurality of rolling bodies, at least two rolling bodies are provided at intervals as a first group along a sliding direction of the first connecting body, at least two first groups are arranged at intervals between the first connecting body and the support.

14. The folding mechanism according to claim 1, wherein the sub-rotor further comprises a second connecting body that is rotatably connected to the base frame; the second connecting body is connected with the first connecting body, and the second connecting body has a bent shape.

15. The folding mechanism according to claim 1, further comprises a connecting rod component, wherein the support is rotatably connected to the base frame via the connecting rod component; wherein the rotor further comprises a connecting rod that is rotatably connected to the connecting rod component, and the sub-rotor is movably connected to the connecting rod.

16. The folding mechanism according to claim 1, wherein the base frame comprises a base frame body and a first mounting rod that is rotatably provided on the base frame body; the sub-rotor is rotatably connected to the base frame body via the first mounting rod.

17. The folding mechanism according to claim 16, wherein the rotor comprises a friction member that is in friction fit with the sub-rotor, and at least two sub-rotors are provided at intervals on the first mounting rod along a length direction of the first mounting rod; the friction member is provided on the first mounting rod, and the friction member is sandwiched between two adjacent sub-rotors.

18. The folding mechanism according to claim 17, wherein the sub-rotor is configured to slide along the length direction of the first mounting rod; the rotor further comprises an elastic component provided on the base frame, wherein the elastic component presses at least one of the sub-rotor or the friction member.

19. A foldable electronic equipment, comprising:
a flexible display screen; and
a folding mechanism, comprising:

a base frame;

a support, movably connected to the base frame;

a rotor, comprising a sub-rotor that is rotatably connected to the base frame, wherein the sub-rotor comprises a first connecting body that is slidingly connected to the support; and a roller, rotatably provided on at least one of the first connecting body or the support, thereby at least part of the first connecting body is in rolling friction fit with the support, wherein the flexible display screen is folded or unfolded through the folding mechanism, one of the support and the first connecting body is provided with a sliding groove, and the other one of the support and the first connecting body is provided with a sliding rail that is in sliding fit with the sliding groove, and wherein the roller is rotatably provided in the sliding groove.

20. The folding electronic equipment according to claim 19, wherein a first part of the roller is rotatably provided on a side wall of the sliding groove, and a second part of the roller is in rolling friction fit with the sliding rail.

* * * * *